United States Patent [19]

Roepnack

[11] 4,185,549
[45] Jan. 29, 1980

[54] BALE INJECTION SYSTEM
[76] Inventor: Alan N. Roepnack, R.D. #1, Richfield Springs, N.Y. 13439
[21] Appl. No.: 881,561
[22] Filed: Feb. 27, 1978
[51] Int. Cl.² .................................................. B30B 15/30
[52] U.S. Cl. ........................................ 100/45; 99/533; 100/73; 100/98 A; 239/271
[58] Field of Search ............... 100/35, 45, 100, 98 A, 100/73, 74, 75; 99/532, 533; 239/271, 289

[56] References Cited

U.S. PATENT DOCUMENTS

| | | | |
|---|---|---|---|
| 1,196,138 | 8/1916 | Muller | 99/533 |
| 1,332,629 | 3/1920 | McIntyre | 99/533 |
| 2,565,422 | 8/1951 | Edwards | 100/45 X |
| 3,163,131 | 12/1964 | Lundell | 100/73 X |
| 3,280,543 | 10/1966 | Lawrence | 100/73 X |
| 3,333,532 | 8/1967 | Shepley | 100/74 X |
| 3,996,848 | 12/1976 | Molitorisz | 100/73 |

FOREIGN PATENT DOCUMENTS

| | | | |
|---|---|---|---|
| 1281086 | 7/1972 | United Kingdom | 100/45 |
| 312581 | 5/1972 | U.S.S.R. | 100/45 |

OTHER PUBLICATIONS

"Agronomy Journal," vol. 67, Nov.–Dec. 1975, pp. 766-769.

*Primary Examiner*—Billy J. Wilhite
*Attorney, Agent, or Firm*—Heslin, Irwin & Nieman

[57] ABSTRACT

Nozzles are mounted on the face of the plunger of a conventional hay baler for injecting a fluid into the mass of hay as it is compacted. The nozzles are connected to a tank holding the fluid through control valves and a metering chamber which serve to limit the period of injection to the compression stroke of the plunger and to limit the quantity of fluid injected.

27 Claims, 5 Drawing Figures

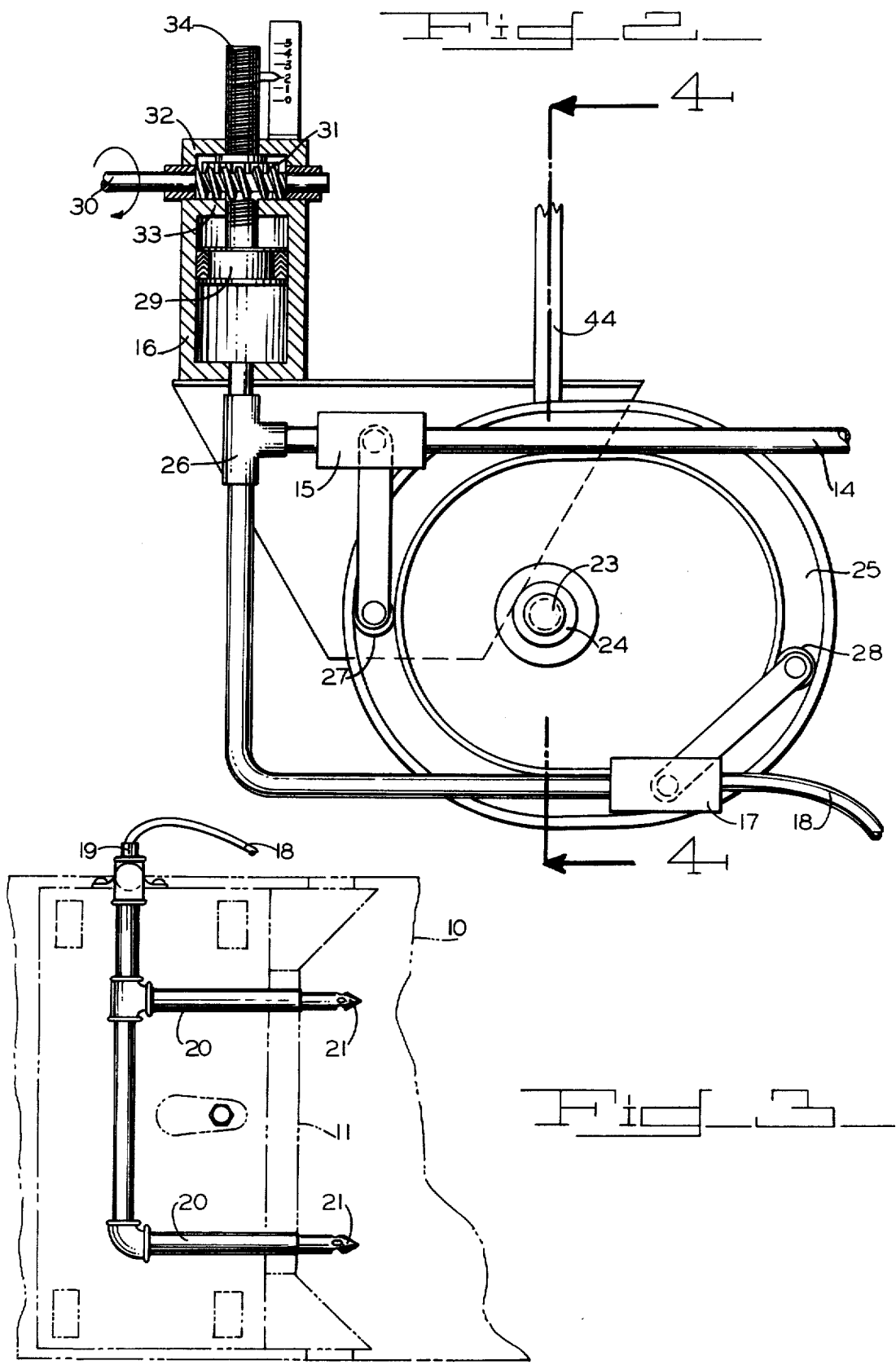

BALE INJECTION SYSTEM

BACKGROUND OF THE INVENTION

The invention relates to the field of farming and more particularly relates to the baling of hay. It concerns an apparatus and a method for applying a fluid such as liquid ammonia to the hay as it is being baled.

It is known to be desirable to treat hay with ammonia as it is being harvested and baled. There are at least two beneficial results. First, it has a preservative effect on hay that prevents mildew and thus, permits even moist or damp hay to be harvested without fear of rapid spoiling. Secondly, it increases the crude protein of the hay and breaks down some of the lignin and fiber in the hay making it more digestable to ruminant animals.

At the present time, there does not appear to be a suitable apparatus for satisfactorily applying ammonia to hay as it is being baled. Although a variety of devices exist which operate in conjunction with conventional balers to apply various substances, none of these are acceptable for the application of ammonia.

The device shown in U.S. Pat. No. 2,504,279 to Sanner, for example, shows an attachment for a conventional baler that is useful in applying salt or other granular additives to hay as it is being baled. Clearly, such a device would not be useful in the application of liquids, particularly volatile ones during the baling operation. These problems are discussed in U.S. Pat. No. 3,996,848 to Molitorisz. That patent concerns itself with a rotary compacting machine whereas the present patent concerns itself with a conventional baler having a reciprocating plunger for compacting the hay or other material being baled.

SUMMARY OF THE INVENTION

The present invention is comprised of one or more nozzles attached to the face of a plunger in a conventional baler and connected to a source of supply of the fluid being applied. Valving and metering devices are connected in the conduit feeding the nozzles so as to permit the injections of fluid to be timed to correspond to the compacting stroke of the plunger and at the same time to limit the quantities of fluid applied.

It is, therefore, an object of this invention to provide an improvement in a conventional baler that will apply precise amounts of liquid ammonia or other fluids to hay being baled.

It is another object of this invention to inject the fluid being applied into the hay mass as it is being formed so as to minimize losses due to evaporation of the fluid.

Another object of the invention is to provide a device that will mount easily on existing conventional balers.

Another object of the invention is to provide a device that is inexpensive to construct while being durable, simple and safe in use.

BRIEF DESCRIPTION OF DRAWINGS

FIG. 2 is an enlarged view of the valving and metering devices shown in FIG. 1.

FIG. 3 is a side view of the manifold and nozzles of the invention mounted on the plunger which is shown in phantom.

Referring now to FIG. 1, there is shown a portion of a conventional baler 10 in phantom. For a description of a conventional baler, reference is made to the "Operator's Manual" for the John Deere, 24 Series Balers, bearing identification number OM-E38936, Issue H7. In FIG. 1, the viewer is looking at the head of a plunger 11. A side view of the plunger is shown in phantom in FIG. 3. The entire baling machine is mounted on a pair of tires 12, although only one is shown in FIG. 1. It will be understood, as shown in FIG. 3, that plunger 11 reciprocates within the housing of baler 10. The plunger head and housing, in effect, form a baling chamber. As one views FIG. 3, when the plunger is moved to the left, it is withdrawn from the hay or other material being compacted. When the plunger is so withdrawn, other mechanisms, not shown, force hay in front of it. Then the plunger is advanced into the hay, causing it to be compacted into a bale. This operation is repeated several times in the formation of a single bale of hay.

As shown in FIG. 1, a storage tank 13 is mounted on the baler above the baling chamber. It is connected by means of a conduit 14 to a metering valve 15. Also connected to the conduit by a T-joint is a metering chamber 16. The conduit then passes through a control valve 17 to a flexible hose 18. Hose 18 is connected to a manifold 19 to which pipes 20 are attached, as more clearly shown in FIG. 3. An injecting nozzle 21 is attached to each pipe 20. Each nozzle has several holes near its tip for the discharge of the ammonia or other fluid being applied as shown in FIG. 5. Each nozzle terminates in a point so as to enable it to easily penetrate the hay or other material being compacted.

FIG. 2 is an enlarged view of the valving and metering devices mentioned above. Conduit 14 is connected to metering valve 15. Cam 22 is mounted on a drive shaft 23 and retained by means of collar 24. Collar 24 may be secured to the drive shaft by means of a set screw or some other suitable method. A track within cam 22 is provided. The outlet side of metering valve 15 is connected by means of a conduit to a T-joint 26. The metering chamber is mounted atop the T-joint 26 and a conduit connects the T-joint to the inlet side of control valve 17. Valves 15 and 17 are equipped with arm and cam follower assemblies 27 and 28 respectively which, in turn, are engaged within track 25. Valves 15 and 17 may be of identical construction and can be any suitable conventional design. Metering chamber 16 is equipped with a piston 29. Piston 29 is adjustable by means of worm gear shaft 30 which is journaled in the housing of metering chamber 16. The worm gear is engaged with a nut 31 which is held captive between the top 32 of metering chamber 16 and surface 33 within the chamber. Nut 31 is threaded to piston shaft 34 which is rotatably connected to piston 29. Rotation of the worm gear shaft 30 imparts rotation to nut 31 which, in turn, causes piston shaft 34 and piston 29 to be moved upwardly or downwardly within metering chamber 16. As will be more fully appreciated hereinafter, this movement of piston 29 permits the volume of metering chamber 16 to be adjusted in order to control the amount of fluid being injected during each stroke of the plunger 11.

Referring now to FIG. 4, there is shown a partial cross-sectional view of cam 22 and a clutch mechanism associated therewith. Drive shaft 23 can be any suitable shaft found on a conventional baler which rotates on a one-to-one basis with the reciprocating cycle of the plunger. On John Deere 24 Series Balers, as depicted in operator's manual, OM-E38936, Issue H7, for example, one can conveniently extend the crankshaft which operates the feeder teeth. This crankshaft is depicted on page 9 of that manual in figure E3139. Drive shaft 23, as shown in FIGS. 1 and 4 is actually an extension of that crankshaft in the preferred embodiment of this invention.

Figure 1:
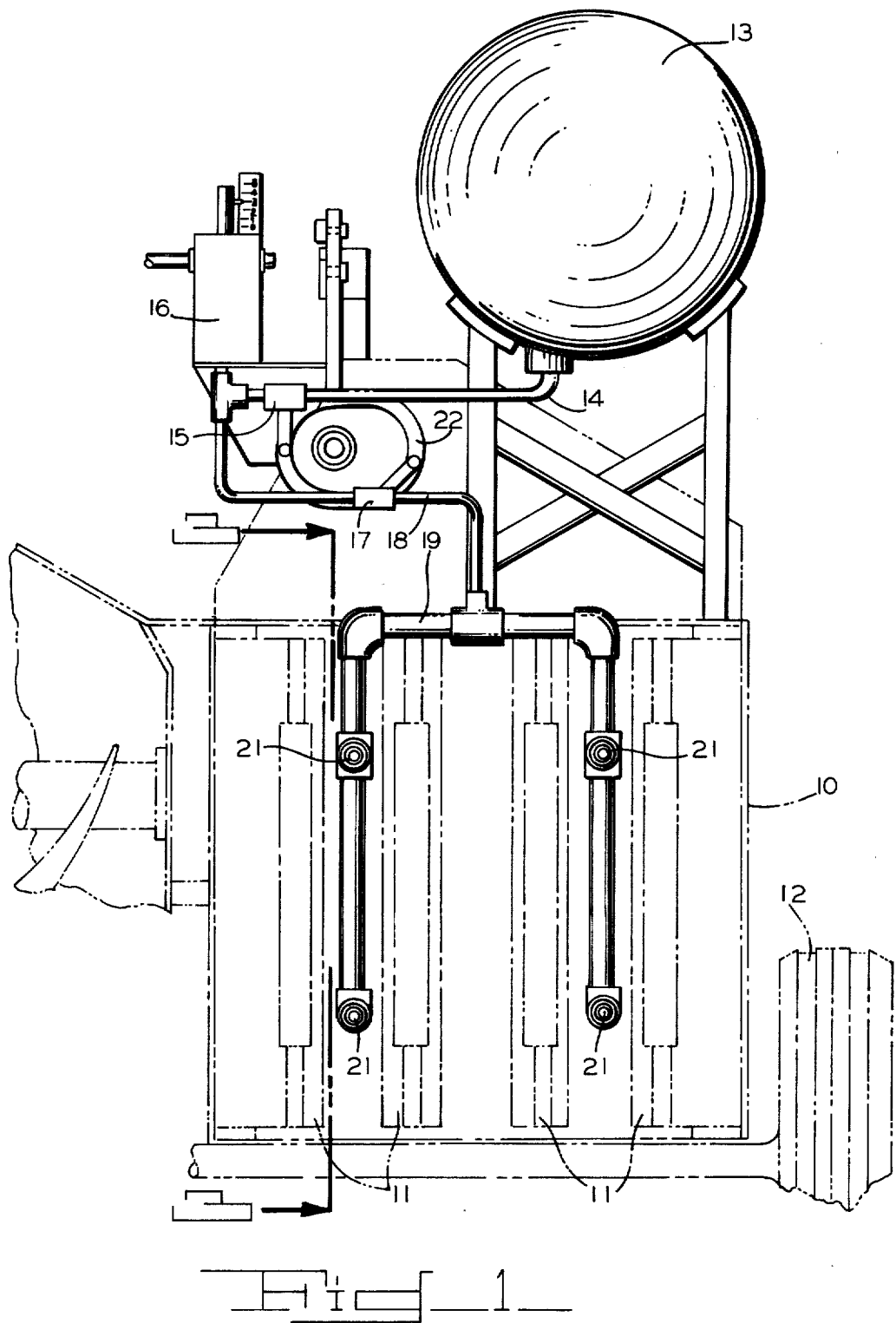
FIG. 1 is an elevation of the invention shown as it would be mounted in a conventional baler, parts of which are shown in phantom.

Cam 22 is rotatably mounted on drive shaft 23. A suitable bushing 35 may be provided within cam 22 to insure its free rotation about shaft 23. Cam 22 is provided with a hub 36 having a dog recess 37. A collar 38 is mounted on shaft 23 by means of a set screw or some other suitable method to keep cam 22 from sliding to the right on shaft 23, as shown in FIG. 4.

Clutch hub 39 is keyed by means of Woodruff key 40 to shaft 23. This permits clutch hub 39 to be slid longitudinally along shaft 23 while, at the same time causing hub 39 to rotate in unison with shaft 23. Washer 41 is slideably fit on clutch hub shaft 42. Lock nut 43 is threaded to clutch hub shaft 42. Yoke 44 is placed around clutch hub shaft 42 between lock nut 43 and washer 41. A suitable operating handle 45 is provided for urging yoke 44 and, in turn, clutch hub 39 to the right or left, as shown in FIG. 4. The face of clutch hub 39 is provided with a dog 46 which is adapted to fit into dog recess 37 in cam 22. Handle 45 is provided with notches 47 which cooperate with bar 48 to hold clutch hub 39 in the engaged or in the disengaged position.

Figure 4:
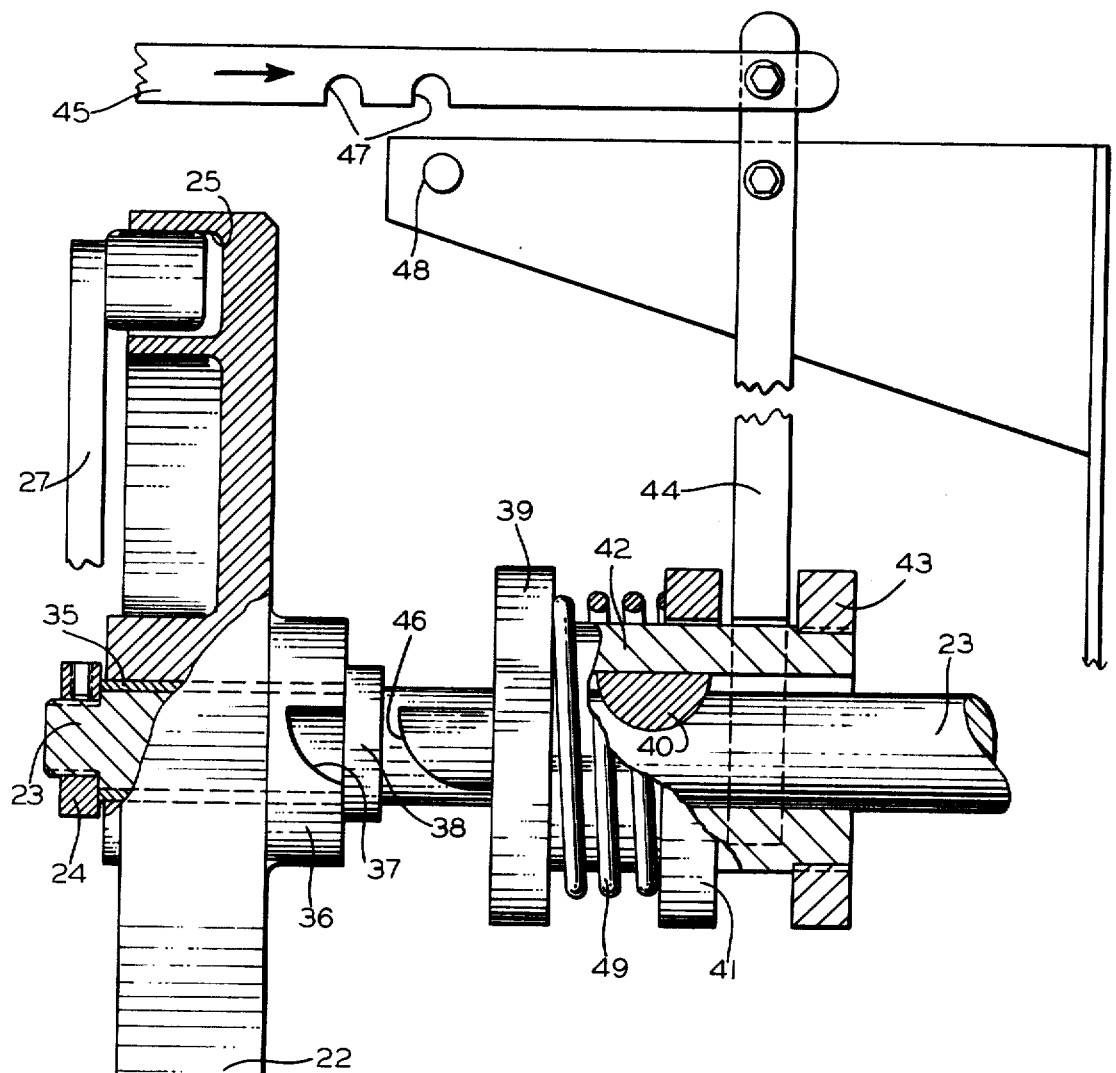
FIG. 4 is a partial cross-sectional view taken on line 4—4 of FIG. 2.
Figure 5:
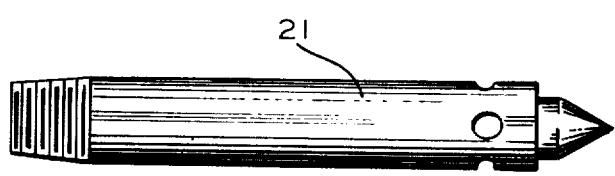
FIG. 5 is a detailed drawing of an injector nozzle.

When it is desired to operate the bale injection system, the operator will move handle 45 so as to urge washer 41 to the left, as shown in FIG. 4. Spring 49 will be compressed, forcing hub 39 to the left and ultimately, causing dog 46 to enter recess 37. When the baler is operating, shaft 23 is turning on a one-to-one basis with each cycle of the reciprocating plunger 11. With clutch hub 39 engaged with cam 22, cam 22 will therefore rotate with the same correspondence to the cycle of the plunger 11.

The construction of valves 15 and 17 and their relationship with cam 22 is such that fluid will be discharged from the nozzles 21 when the plunger is in the advanced position for compacting hay and the fluid will not be discharged when the plunger is in the withdrawn position. This is accomplished in the following way. When the plunger is on its return stroke, the metering valve 15 will be opened due to the action of cam 22 on arm and cam follower assembly 27. Control valve 17 will be closed. With the valves in this condition, the liquid ammonia contained in storage tank 13 will flow into metering chamber 16. As the plunger 11 is advanced, metering valve 15 will be closed and control valve 17 and be opened due to the rotation of cam 22 and its effect on cam follower assemblies 27 and 28. This will permit the charge of liquid ammonia contained within metering chamber 16 to flow through flexible tubing 18 and into the manifold 19 and through nozzles 21 into the hay being compacted. Then the cycle is repeated.

This invention works particularly well with liquid ammonia. The vapor pressure of liquid ammonia maintains a pressure of 75 to 100 pounds per square inch at normal ambient temperatures. This pressure causes a good flow of ammonia from the storage tank, into the metering chamber 16 and from the metering chamber through nozzles 21. Other fluids maintained under suitable pressure will work just as well.

One of the advantages of applying liquid ammonia to hay with this invention as the hay is being baled is that the ammonia becomes trapped within the hay. Being volatile, it tends to evaporate and thus diffuse itself throughout the bale.

What has been described is the best embodiment of the invention known to the inventor at this time. Clearly there are many modifications and substitutions of devices which could be made without departing from the spirit of this invention. It is intended to encompass all such modifications within the following appended claims.

What is claimed is:

1. An improved baler of the type having a reciprocating plunger for compacting fibrous materials, said plunger being operable between an advanced position for compacting materials and a withdrawn position for receiving materials to be compacted, wherein the improvement comprises:
   means connected to the plunger for injecting a fluid into the mass of fibrous materials being compacted; and
   storage means communicating with the injecting means for storing under pressure and supplying under pressure the fluid to be injected; and
   control means responsive to the position of the plunger and communicating between the injecting means and the storage means for terminating the supply of fluid to the injecting means at least when the plunger is in the withdrawn position.

2. The invention of claim 1 further comprising measuring means communicating between the storage means and the control means for limiting the amount of fluid to be supplied to the injecting means each time the plunger is operated to its advanced position.

3. The invention of claim 2 wherein the injecting means is comprised of at least one injection nozzle adapted to penetrate the fibrous material as the plunger compacts it.

4. The invention of claim 2 wherein the injecting means communicates with the storage means through a conduit, and wherein the control means is comprised of:
   a control valve connected in the conduit and operable, by means of an arm connected thereto, to an opened and a closed position;
   a drive shaft adapted to make one revolution with each reciprocating cycle of the plunger; and
   a cam mounted on the drive shaft for engaging the arm and urging it to the opened position when the plunger is in the advanced position and to the closed position when the plunger is in the withdrawn position.

5. The invention of claim 4 further comprising clutch means connected between the drive shaft and the cam for selectively engaging and disengaging the cam and the drive shaft to and from one another.

6. The invention of claim 5 wherein the measuring means is comprised of:
   a metering chamber connected between the storage means and the control means; and
   a metering valve connected between the metering chamber and the storage means operable, by means of an arm connected thereto, to an opened and a closed position, said arm being engaged with the cam and adapted to be urged by the cam to the opened position when the control valve is closed and to the closed position when the control is opened.

7. The invention of claim 6 wherein the metering chamber includes means for adjusting its volume.

8. A fluid injection system for use with a baler having a reciprocating plunger for compacting materials being baled, said plunger being operable between an advanced position for compacting materials and a withdrawn position for receiving materials to be compacted, comprising:

injecting means adapted to penetrate materials being baled and further adapted to be attached to the plunger; and storage means communicating with the injecting means for storing under pressure and supplying under pressure the fluid to be injected; and control means responsive to the position of the plunger and communicating between the injecting means and the storage means for terminating the supply of fluid to the injecting means at least when the plunger is in the withdrawn position.

9. The invention of claim 8 further comprising measuring means communicating between the storage means and the control means for limiting the amount of fluid to be supplied to the injecting means each time the plunger is operated to its advanced position.

10. The invention of claim 9 wherein the injecting means communicates with the storage means through a conduit, and wherein the control means is comprised of:

a control valve connected in the conduit and operable, by means of an arm connected thereto, to an opened and a closed position;

a drive shaft adapted to make one revolution with each reciprocating cycle of the plunger; and a cam mounted on the drive shaft for engaging the arm and urging it to the opened position when the plunger is in the advanced position and to the closed position when the plunger is in the withdrawn position.

11. The invention of claim 10 further comprising clutch means connected between the drive shaft and the cam for selectively engaging and disengaging the cam and the drive shaft to and from one another.

12. The invention of claim 11 wherein the measuring means is comprised of:

a metering chamber connected between the storage means and the control means; and a metering valve connected between the metering chamber and the storage means operable, by means of an arm connected thereto, to an opened and a closed position, said arm being engaged with the cam and adapted to be urged by the cam to the opened position when the control valve is closed and to the closed position when the control valve is opened.

13. The invention of claim 12 wherein the metering chamber includes means for adjusting its volume.

14. An improved baler of the type having a reciprocating plunger for compacting fibrous materials, said plunger being operable between an advanced position for compacting materials and a withdrawn position for receiving materials to be compacted, wherein the improvement comprises:

means connected to the plunger for injecting a fluid into the mass of fibrous materials being compacted;

storage means communicating with the injecting means for storing and supplying the fluid to be injected;

control means engageable to be responsive to the position of the plunger and communicating between the injecting means and the storage means for terminating the supply of fluid to the injecting means when the plunger is in the withdrawn position and permitting the supply of fluid to the injecting means when the plunger is in the advanced position;

measuring means communicating between the storage means and the control means for limiting the amount of fluid to be supplied to the injecting means each time the plunger is operated to its advanced position; and means for selectively engaging and disengaging the control means.

15. An improved baler of the type having a reciprocating plunger for compacting fibrous materials, said plunger being operable between an advanced position for compacting materials and a withdrawn position for receiving materials to be compacted, wherein the improvement comprises:

means connected to the plunger for injecting a fluid into the mass of fibrous materials being compacted;

storage means communicating with the injecting means for storing and supplying the fluid to be injected;

control means engageable to be responsive to the position of the plunger for causing the flow of fluid to the injecting means only when the plunger is in the advanced position;

measuring means communicating between the storage means and the control means for limiting the amount of fluid to be supplied to the injecting means each time the control means causes fluid to flow thereto; and means for selectively engaging and disengaging the control means.

16. The invention of claim 14 or 15 wherein the injecting means is comprised of at least one injection nozzle adapted to penetrate the fibrous material as the plunger compacts it.

17. The invention of claim 16 wherein the injecting means communicates with the storage means through a conduit, and wherein the control means is comprised of:

a control valve connected in the conduit and operable, by means of an arm connected thereto, to an opened and a closed position;

a drive shaft adapted to make one revolution with each reciprocating cycle of the plunger; and a cam mounted on the drive shaft for engaging the arm and urging it to the open position when the plunger is in the advanced position and to the closed position when the plunger is in the withdrawn position.

18. The invention of claim 17 wherein the means for selectively engaging and disengaging the control means comprises clutch means connected between the drive shaft and the cam for selectively engaging and disengaging the cam and the drive shaft to and from one another.

19. The invention of claim 18 wherein the measuring means is comprised of:

a metering chamber connected between the storage means and the control means; and a metering valve connected between the metering chamber and the storage means operable by means of an arm connected thereto, to an opened and a closed position, said arm being engaged with the cam and adapted to be urged by the cam to the open position when the control valve is closed, and to the closed position when the control valve is open.

20. The invention of claim 19 wherein the metering chamber includes means for adjusting its volume.

21. A fluid injection system for use with a baler having a reciprocating plunger for compacting materials being baled, said plunger being operable between an advanced position for compacting materials and a withdrawn position for receiving materials to be compacted, comprising:
- injecting means adapted to penetrate materials being baled and further adapted to be attached to the plunger;
- storage means communicating with the injecting means for storing and supplying the fluid to be injected;
- control means engageable to be responsive to the position of the plunger and communicating between the injecting means and the storage means for terminating the supply of fluid to the injecting means when the plunger is in the withdrawn position and permitting the supply of fluid to the injecting means when the plunger is in the advanced position;
- measuring means communicating between the storage means and the control means for limiting the amount of fluid to be supplied to the injecting means each time the plunger is operated to its advanced position; and
- means for selectively engaging and disengaging the control means.

22. A fluid injection system for use with a baler having a reciprocating plunger for compacting materials being baled, said plunger being operable between an advanced position for compacting materials and a withdrawn position for receiving materials to be compacted, comprising:
- injecting means adapted to penetrate materials being baled and further adapted to be attached to the plunger;
- storage means communicating with the injecting means for storing and supplying the fluid to be injected;
- control means engageable to be responsive to the position of the plunger for causing the flow of liquid to the injecting means only when the plunger is in the advanced position;
- measuring means communicating between the storage means and the control means for limiting the amount of fluid to be supplied to the injecting means each time the control means causes fluid to flow thereto; and
- means for selectively engaging and disengaging the control means.

23. The invention of claim 21 or 22 wherein the injecting means is comprised of at least one injection nozzle.

24. The invention of claim 23 wherein the injecting means communicates with the storage means through a conduit, and wherein the control means is comprised of:
- a control valve connecting in the conduit and operable by means of an arm connected thereto, to an opened and a closed position;
- a drive shaft adapted to make one revolution with each reciprocating cycle of the plunger; and
- a cam mounted on the drive shaft for engaging the arm and urging it to the opened position when the plunger is in the advanced position and to the closed position when the plunger is in the withdrawn position.

25. The invention of claim 24 wherein the means for selectively engaging and disengaging the control means comprises clutch means connected between the driveshaft and the cam for selectively engaging and disengaging the cam and the drive shaft to and from one another.

26. The invention of claim 25 wherein the measuring means is comprised of:
- a metering chamber connected between the storage means and the control means; and
- a metering valve connected between the metering chamber and the storage means operable, by means of an arm connected thereto, to an opened and a closed position, said arm being engaged with the cam and adapted to be urged by the cam to the opened position when the control valve is closed and to the closed position when the control valve is opened.

27. The invention of claim 26 wherein the metering changer includes means for adjusting its volume.

* * * * *